L. SCHMOULOUSKY.
PROCESS OF MANUFACTURING HATS AND OTHER ARTICLES.
APPLICATION FILED FEB. 8, 1911.

1,020,314.  Patented Mar. 12, 1912.

Inventor
Leon Schmoulousky,

Witnesses
J. H. Crawford.
C. C. Hines.

By Victor J. Evans
Attorney

UNITED STATES PATENT OFFICE.

LEON SCHMOULOUSKY, OF MATTEAWAN, NEW YORK.

PROCESS OF MANUFACTURING HATS AND OTHER ARTICLES.

1,020,314.      Specification of Letters Patent.      Patented Mar. 12, 1912.

Application filed February 8, 1911. Serial No. 607,226.

*To all whom it may concern:*

Be it known that I, LEON SCHMOULOUSKY, a subject of the Czar of Russia, residing at Matteawan, in the county of Dutchess and State of New York, have invented new and useful Improvements in Processes of Manufacturing Hats and other Articles, of which the following is a specification.

This invention relates to a process of manufacturing hats and other articles, and its object is to provide a simple and inexpensive process susceptible of use in the manufacture of hats and other articles formed of textile fabrics, rubber, paper, etc., whereby the surfaces of the article may be rendered proof against the deleterious actions of air and water and at the same time give an ornamental finish of any desired color and a high degree of luster.

Figure 1:
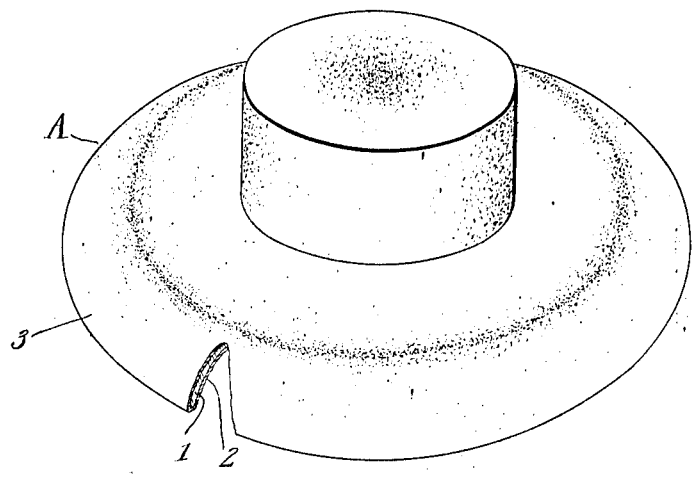
Figure 2:
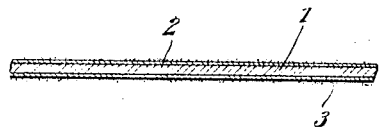

In the accompanying drawing:—Figure 1 is a perspective view of a hat made in accordance with my process, a portion of the same being broken away. Fig. 2 is a section through the body of the hat.

In carrying my invention into practice for the manufacture of hats and other goods from paper, felt, and other like materials, I first prepare a stiffening agent composed of flour and water, boiled to the desired consistency and mixed, after being allowed to cool, with a desired quantity of boiled linseed oil. Into the stiffening paste thus produced, the body of the hat or article is submerged until saturated, when it is removed and wrung out by hand or machine, then placed upon hot blocking dies and then pressed. The hat or article is then removed from the press, again dipped in the paste, a second time pressed, and then subjected to heat in a drying room until it is thoroughly dried. The hat or article is then removed from the drying room and first thoroughly oiled with boiled linseed oil, then pounced with pumice stone until soft and smooth, and then returned to the drying room for a second drying out. After the hat is dried the steps of oiling and pouncing the same are repeated, and the hat returned to the drying room and again dried, whereby it is rendered both smooth and waterproof. The hat is then taken from the drying room and pounced with sand paper, after which it is coated with an ordinary paint of the color desired. While the paint is still wet, the surface of the hat or article is covered with silk floss or flock of the same color as the paint, which is sprinkled thereon. The surface of the article thus provided is then brushed smoothly and evenly by means of a soft hand brush, making the coating uniform over the entire surface of the article.

By means of the above described process, waterproof hats of a high degree of strength and durability may be manufactured from paper and other cheap materials with less cost of time and labor than the ordinary process of manufacture, and an ornamental style of hat produced having a high degree of luster. The article thus made comprises a body portion, 1, saturated with a waterproof substance and having a water-proof coating 2 of paint on each of its exposed surfaces, and a finish 3 formed of silk flock of the desired color, the flock being firmly cemented by paint to the body and water-proof filler.

Fig. 1 shows a hat A made in accordance with the described process.

Having thus described the invention, I claim:—

The herein described process of manufacturing hats and other articles, which consists in first dipping the material in a stiffening paste composed of flour, water and linseed oil, wringing out the excess paste, forming the article on hot dies, pressing the same smoothly, again dipping the formed article in the paste and pressing the same, drying the article, coating the same with boiled linseed oil, then pouncing the article with pumice stone one or more times, again drying the same, pouncing the article with sand paper, painting the surface of the article with a paint of the desired color, sprinkling the painted surface with silk floss, and finally brushing the floss to a desired smoothness.

In testimony whereof I affix my signature in presence of two witnesses.

LEON SCHMOULOUSKY.

Witnesses:
     AMBER DOLSON,
     ALEXANDER J. SMITH.